United States Patent
Hara et al.

(10) Patent No.: US 6,934,265 B2
(45) Date of Patent: Aug. 23, 2005

(54) INTERFERENCE CANCELLATION RECEIVER FOR HIGH-SPEED COMMUNICATION SYSTEMS

(75) Inventors: Susuma Hara, Austin, TX (US); Mark Callicotte, Sacramento, CA (US)

(73) Assignee: KeyEye, Sacramento, CA (US)

( * ) Notice: Subject to any disclaimer, the term of this patent is extended or adjusted under 35 U.S.C. 154(b) by 0 days.

(21) Appl. No.: 10/910,155

(22) Filed: Aug. 2, 2004

(65) Prior Publication Data

US 2005/0070228 A1 Mar. 31, 2005

Related U.S. Application Data

(60) Provisional application No. 60/506,215, filed on Sep. 25, 2003.

(51) Int. Cl.[7] .............................. H04B 1/10; H04B 1/04
(52) U.S. Cl. .................. 370/286; 455/63.1; 455/114.2; 455/295; 370/286; 370/289; 375/254; 375/346
(58) Field of Search ............................ 455/63.1, 114.2, 455/126, 278.1, 295, 296, 570; 370/286, 289; 375/254, 285, 296, 346

(56) References Cited

U.S. PATENT DOCUMENTS

| | | | | |
|---|---|---|---|---|
| 6,118,814 A | * | 9/2000 | Friedman | 375/232 |
| 6,396,329 B1 | * | 5/2002 | Zerbe | 327/336 |
| 6,469,988 B1 | * | 10/2002 | Yang et al. | 370/289 |
| 2002/0176570 A1 | | 11/2002 | Apfel | 379/406.01 |
| 2003/0099208 A1 | * | 5/2003 | Graziano et al. | 370/286 |
| 2003/0142688 A1 | * | 7/2003 | Chou et al. | 370/420 |
| 2003/0231617 A1 | * | 12/2003 | Ubale | 370/352 |
| 2004/0213146 A1 | * | 10/2004 | Jones et al. | 370/210 |
| 2004/0247022 A1 | * | 12/2004 | Raghavan et al. | 375/219 |

OTHER PUBLICATIONS

Xiaoyun Hu et al. "A Switched–Current Sample–and–Hold Circuit," IEEE Journal of Solid–State Circuits, vol. 32, No. 6, Jun. 1997, pp. 898–904.

Valdimir Friedman et al. "The Implementation of Digital Echo Cancellation in Codecs" IEEE Journal of Solid–State Circuits, vol. 25, No. 4, Aug. 1990, pp. 979–986.

Tai–Cheng Lee et al. "A 125–Mhz Mixed–Signal Echo Canceller for Gigabit Ethernet on Copper Wire," IEEE Journal of Solid–State Circuits, vol 36, No. 3, Mar. 2001, pp. 366–373.

* cited by examiner

*Primary Examiner*—Simon Nguyen
(74) *Attorney, Agent, or Firm*—Lumen Intellectual Property Services, Inc.

(57) ABSTRACT

Interference reduction with a current-mode transversal filter having taps including binary current sources is provided. Each binary current source provides an output current having either of two distinct values, depending on a binary input. The product of a tap coefficient and an interference data signal value is obtained by independently generating the contribution from each interference data bit using a binary current source and providing these contributions to a current summing junction. Binary current sources can be implemented in analog, digital, or mixed-mode circuitry. Echo, near end cross talk, and far end cross talk are examples of interference that can be reduced in this manner. The use of binary current sources provides significant flexibility, especially in connection with multilevel modulation schemes such as pulse amplitude modulation (PAM).

15 Claims, 6 Drawing Sheets

INTERFERENCE CANCELLATION RECEIVER FOR HIGH-SPEED COMMUNICATION SYSTEMS

CROSS REFERENCE TO RELATED APPLICATIONS

This application is related to and claims priority from U.S. provisional application No. 60/506,215, filed Sep. 25, 2003, entitled "Echo Cancellation Method and Implementation for High-speed Full Duplex Communication Systems" and hereby incorporated by reference.

FIELD OF THE INVENTION

This invention relates to cancellation of an interfering signal in communication systems.

BACKGROUND

Communication can be regarded as a problem of recovering a desired signal from an input signal that includes undesired signals in addition to the desired signal. Undesired signals include random noise, as well as interference signals which are not random. In many cases, interference signals are generated within a communication system by hardware limitations. For example, when a 2-wire channel is used for full-duplex communication, the signal transmitted to the channel generates an interference signal (often referred to as "echo") which interferes with reception of signals from the channel. The effect of interference signals which are generated within a communication system (e.g., echo) on reception can generally be reduced because such interference is derived from signals which are known within the communication system.

More specifically, one can regard a communication system as providing a parasitic system having an interference data stream as its input and the undesired interference signal as its output. For example, an imperfect hybrid in a 2-wire communication system provides such a parasitic system, where the transmitted data stream on the 2-wire channel is the interference data stream. Since communication systems are usually linear, the effect of the interference signal provided by the parasitic system can be reduced by deriving an appropriate correction signal from the interference data stream and adding the resulting correction signal to the received signal.

The correction signal is usually derived from the interference data stream by passing it through a linear filter. In cases where the parasitic system leading to the interference is time-invariant, the correction filter can also be time-invariant. Otherwise, the correction filter is usually time-dependent and is placed within a control loop for varying the filter parameters to minimize the contribution of the interference signal to the corrected received signal. Such filters are often referred to as adaptive filters.

Correction filters as described above are frequently implemented by passing the input signal though a tapped delay line. Each tap of the delay line corresponds to a different time delay applied to the input signal. For example, tap 1 could correspond to a delay of $T_0$, tap 2 to a delay of $2T_0$, etc. In this architecture, the overall filter output is obtained by multiplying each tap output by a corresponding tap weight, and adding the resulting terms. Such filters are also known as transversal filters.

Transversal filters as described above have been known for some time, and thus numerous implementations are known in the art. For example, an extensive body of work relates to reducing the computation time required for digital transversal filters, which is mainly determined by the required multiplications. Such work includes the use of filters having tap weights that are exact powers of 2, so that multiplication can be performed by simple bit shift operations. In addition to such mathematical investigations, various physical implementations of transversal filters have been demonstrated. For example, in the common case where a transversal filter is implemented electrically, mathematical signals can be related to circuit voltages or to circuit currents.

Although voltage-mode transversal filters are more common than current-mode transversal filters, current mode filters can be advantageous in certain cases. U.S. Pat. No. 6,469,988 considers an example of a current-mode transversal filter used for echo cancellation in a communication system having binary modulation. However, many common communication systems employ non-binary modulation, and U.S. Pat. No. 6,469,988 does not consider such cases.

Another example of a current-mode transversal filter for echo cancellation is given in Lee et al., "A 125 MHz Mixed Signal Echo Canceller for Gigabit Ethernet on Copper Wire", IEEE Journal of Solid State Circuits 36(3), pp 366–373, 2001. In this example, 5 level pulse amplitude modulation (PAM) is employed, and a single digital to analog converter (DAC) is used to provide multiplication at each tap. However, applicability to other modulation formats is not considered by Lee et al. Furthermore, in some cases, it is not practical to perform tap multiplication with a single DAC.

Accordingly, it is an object of the invention to provide current mode circuitry for interference reduction that is applicable to a variety of non-binary modulation formats. Another object of the invention is to provide current mode circuitry for interference reduction that can be used with various multiplier approaches.

SUMMARY

The present invention provides interference reduction with a current-mode transversal filter having taps including binary current sources. Each binary current source provides an output current having either of two distinct values, depending on a binary input. The product of a tap coefficient and an interference data signal value is obtained by independently generating the contribution from each interference data bit using a binary current source and providing these contributions to a current summing junction. Binary current sources can be implemented in analog, digital, or mixed-mode circuitry. Echo, near end cross talk, and far end cross talk are examples of interference that can be reduced in this manner. The use of binary current sources provides significant flexibility, especially in connection with multi-level modulation schemes such as pulse amplitude modulation (PAM).

DETAILED DESCRIPTION

Figure 1:
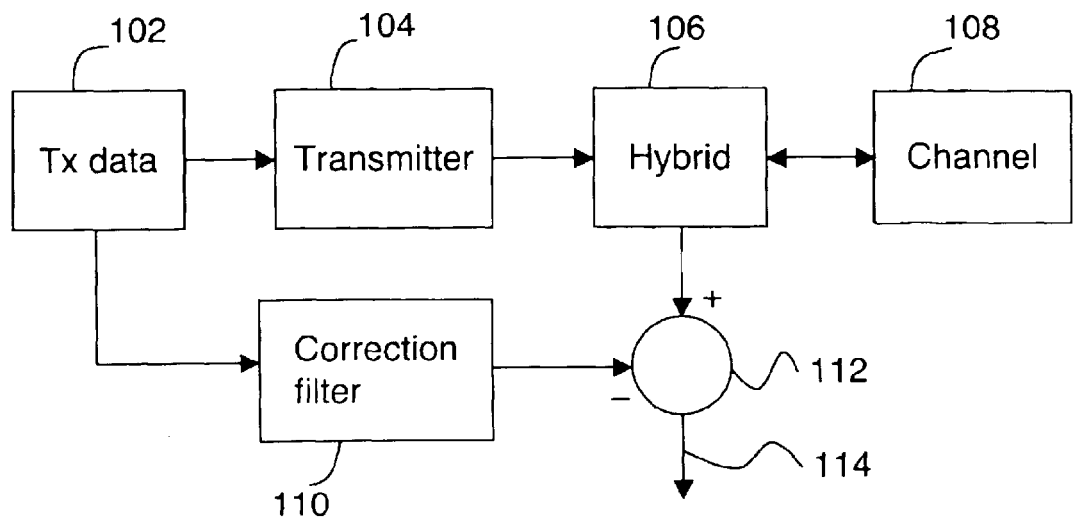
FIG. 1 is a block diagram of a prior art communication system including an echo canceller.

FIG. 1 is a block diagram of a prior art communication system including an echo canceller. In the example of FIG. 1, transmitted data 102 is provided to a transmitter 104. Transmitter 104 provides a transmitted signal derived from transmitted data 102 to a hybrid 106. Hybrid 106 is bidirectionally connected to a channel 108. Thus hybrid 106 also receives an input signal from channel 108. Hybrid 106 provides this input signal to a summing junction 112. The main purpose of hybrid 106 is to provide separate transmit and receive signal paths in the system, even though channel 108 is bidirectional and carries both transmitted and received signal simultaneously.

In general, the transmitted signal interferes with the received input signal. Such interference is typically additive, and can be due to imperfections in hybrid 106 (e.g., direct transmission from transmitter 104 to summing junction 112) and/or from reflections within channel 108. Thus hybrid 106 provides an input signal $z(t)=r(t)+f_{int}(t)$ to summing junction 112, where $r(t)$ is the received data signal and $f_{int}(t)$ is the interference signal derived from transmitted data 102

In order to reduce the effect of such interference, transmitted data 102 is also provided to a correction filter 110. The output of correction filter 110, $g(t)$, is provided to summing junction 112 with a negative sign, as indicated on FIG. 1. Summing junction 112 provides a processed signal 114 equal to $r(t)+f_{int}(t)-g(t)$. In order to minimize the effect of transmitted signal interference in processed signal 114, the correction filter output $g(t)$ should be a good approximation to the interference signal $f_{int}(t)$. Methods for designing correction filter 110 to provide such an approximation are known in the art. In many cases, the relation between transmitted data 102 and the interference signal $f_{int}(t)$ varies with time (e.g., reflections in channel 108 can be time-varying). In order to accommodate such time variation, the relation between transmitted data 102 and $g(t)$ also needs to be time-varying, and accordingly correction filter 110 is an adaptive filter. Adaptive filters and methods for their use and control are also known in the art. Correction filter 110 is frequently implemented as a transversal filter, since such filters are relatively simple to implement, especially adaptively.

Figure 2:
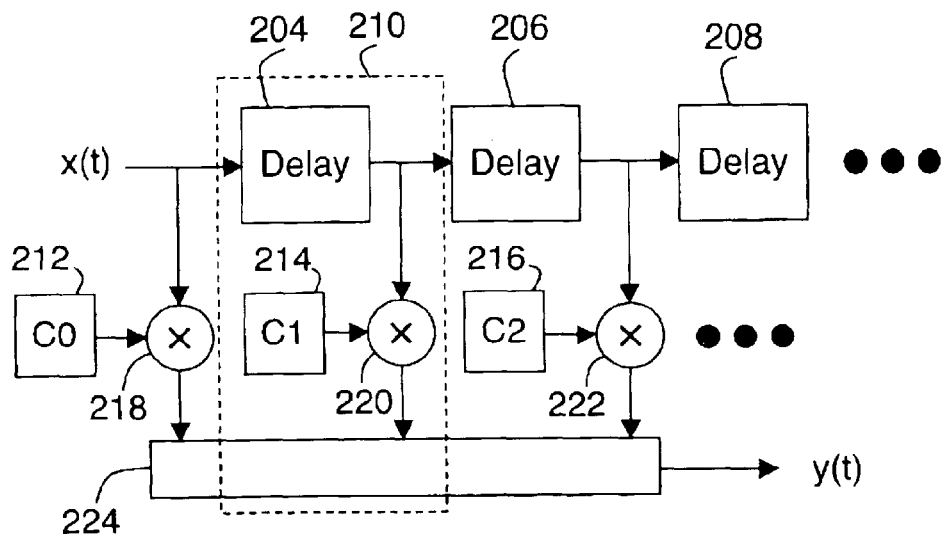
FIG. 2 is a block diagram of a prior art transversal filter.

FIG. 2 is a block diagram of a prior art transversal filter. In this example, an input $x(t)$ is provided to a delay line including delay elements 204, 206, 208, etc. Here each delay element introduces one unit of delay, referred to as T. Thus $x(t-T)$ is the output of delay element 204, $x(t-2T)$ is the output of delay element 206, $x(t-3T)$ is the output of delay element 208, etc. The delay line of the transversal filter is tapped at each of the delay element outputs. For example, tap 210 is one such tap, where $x(t-T)$ (the output of delay element 204) is multiplied by C1 (coefficient 214) at a multiplier 220 and provided to a summing junction 224. Similarly, C0 and C2 (coefficients 212 and 216) are multiplied by $x(t)$ and $x(t-2T)$ at multipliers 218 and 222 respectively and provided to summing junction 224. For generality, a tap with coefficient C0 is shown having no delay. The filter output $y(t)$ is the sum of the contributions from each tap, so $y(t)=C0*x(t)+C1*x(t-T)+C2*x(t-2T)+\text{etc}$.

Many physical implementations of the transversal filter of FIG. 2 are possible. For example, the filter of FIG. 2 can be implemented in electrical circuitry where signals (e.g., $x(t)$ and $y(t)$) are represented by voltages or by currents. Representation of signals by currents is advantageous for transversal filters, because summing junction 224 for currents can be a simple passive circuit node. Such a node can provide high bandwidth operation for a large number of taps more easily than a voltage-mode equivalent. In practice, the number of taps can be 200 or more without significant degradation of performance, since the load imposed on the summing node by each tap current source is determined mainly by the very small drain capacitance of saturated MOS devices. In order to perform echo cancellation with current-mode circuitry, insertion of a voltage to current converter between hybrid 106 and summing junction 112 (e.g., as shown on FIG. 8) is typically required. The reason for this is that signals on channel 108 are usually voltage signals.

Figure 3:
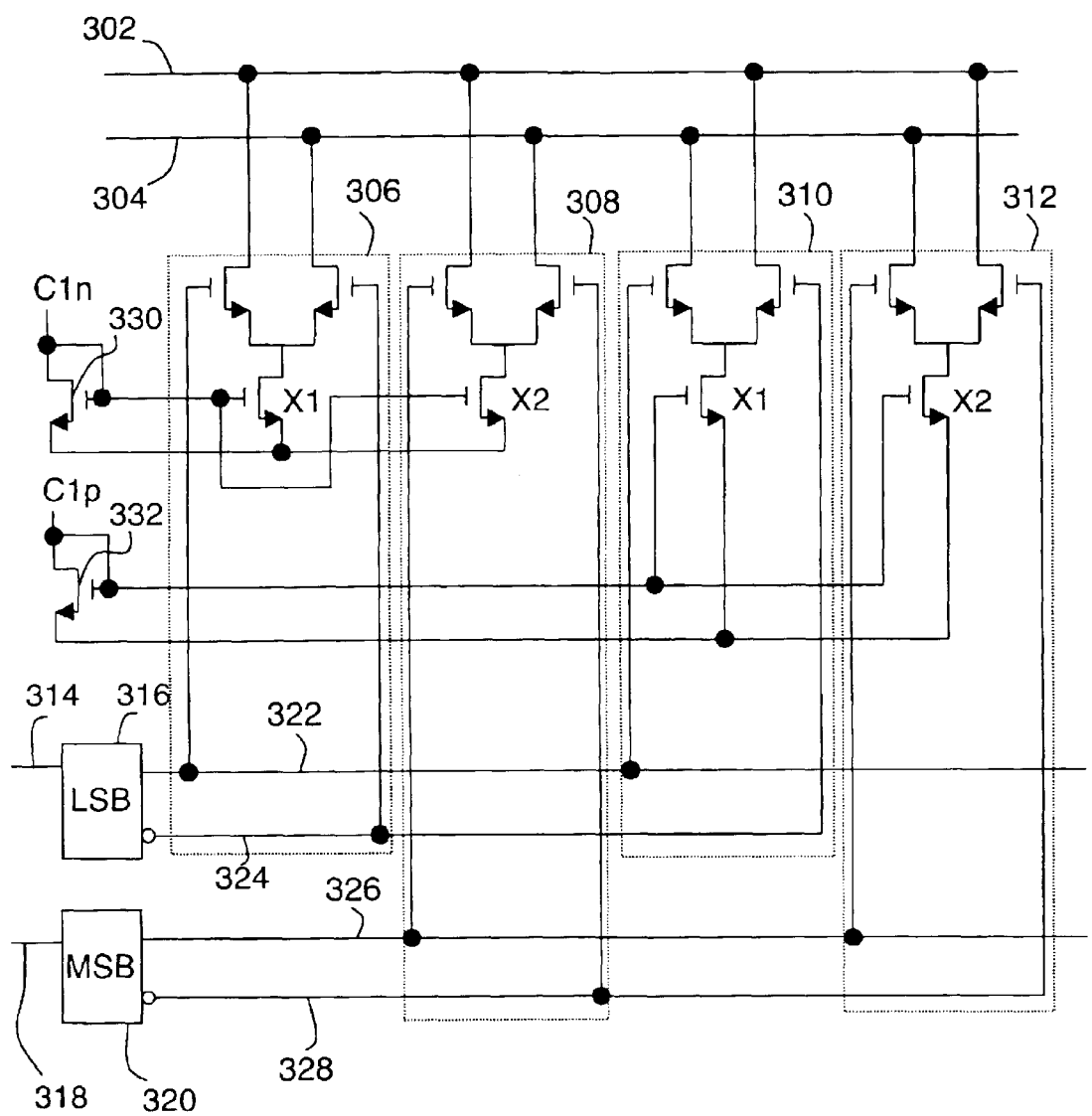
FIG. 3 is a circuit schematic diagram of a current-mode transversal filter tap according to an embodiment of the invention.

FIG. 3 is a circuit schematic diagram of a current-mode transversal filter tap according to an embodiment of the invention. Since a transversal filter as in FIG. 2 is a sequence of taps, detailed implementation need only be shown for a single tap, as on FIG. 3. In the example of FIG. 3, 4-level pulse amplitude modulation (PAM) is employed, so each data signal baud is constructed from 2 data bits. These two data bits are provided as inputs 314 and 318 to the tap of FIG. 3. The bit on input 314 is the least significant bit (LSB), and the bit on input 318 is the most significant bit (MSB). Input 314 is connected to a register 316, which provides complementary outputs 322 and 324. Similarly, input 318 is connected to a register 320, which provides complementary outputs 326 and 328. Output 322 is input 314 delayed by one time unit, and output 326 is input 318 delayed by one time unit. Thus registers 316 and 320 act as delay elements, such as 204 on FIG. 2. Outputs 322 and 326 from registers 316 and 320 respectively provide data inputs to the next tap (not shown), thereby creating a delay line such as shown on FIG. 2.

In the example of FIG. 3, differential currents are used to represent signals, in order to reduce interference from common-mode currents. Thus the mapping between data bit values and corresponding current values is as follows:

| Data MSB | Data LSB | Current Signal |
|----------|----------|----------------|
| 1        | 1        | 3              |
| 1        | −1       | 1              |
| −1       | 1        | −1             |
| −1       | −1       | −3             |

The other input to the tap of FIG. 3 is a current signal representing the mathematical coefficient C1 on FIG. 2. This input is also provided as a differential current input, such that C1p−C1n is an analog current proportional to the coefficient C1. Current inputs C1p and C1n are provided to transistors 332 and 330 respectively.

The tap of FIG. 3 includes four analog Gilbert cell multipliers: 306, 308, 310, and 312, each providing an output current proportional to the product of its inputs. Gilbert cell analog multipliers are known in the art.

Multiplier 306 has C1n and the data LSB as inputs.
Multiplier 308 has C1n and the data MSB as inputs.
Multiplier 310 has C1p and the data LSB as inputs.
Multiplier 312 has C1p and the data MSB as inputs.

Multipliers 306 and 310 have the same proportionality constant K between output and product of inputs. Multipliers 308 and 312 have the same proportionality constant 2K between output and product of inputs. This arrangement of multiplier proportionality constants ensures that the MSB data bit has twice the effect on the output as the LSB data bit, consistent with the 4-level PAM scheme discussed above.

Multipliers 306, 308, 310, and 312 all have differential outputs connected to a differential current summing node formed by nodes 302 and 304. Multipliers 310 and 312 are connected to nodes 302 and 304 with opposite polarity compared to multipliers 306 and 308. This difference in polarity ensures that the output current on nodes 302 and 304 depends on the difference C1p−C1n, as required. Thus the differential output current on nodes 302 and 304 is proportional to the product of C1 and the data signal 2*MSB+LSB. Thus the tap of FIG. 3 is an implementation of tap 210 on FIG. 2.

Multipliers 306, 308, 310 and 312 can be regarded as binary current sources (BCS). More specifically, such a binary current source provides either of two currents to its output responsive to a binary input. Typically, several binary current sources are required for each tap, as shown on FIG. 3, to provide differential outputs and/or to accommodate modulation methods having more than 2 levels. Thus, the approach of the present invention entails several binary current sources per tap, in contrast with conventional approaches having a single multiplier per tap. A resulting advantage of the invention is broad applicability to various modulation methods. More specifically, the use of simple binary current sources as "building blocks" for filter taps provides significant design flexibility. Furthermore, the present approach advantageously simplifies design and fabrication relative to conventional approaches having a single multiplier, since such multipliers are often much more complicated than several binary current sources.

Figure 4:
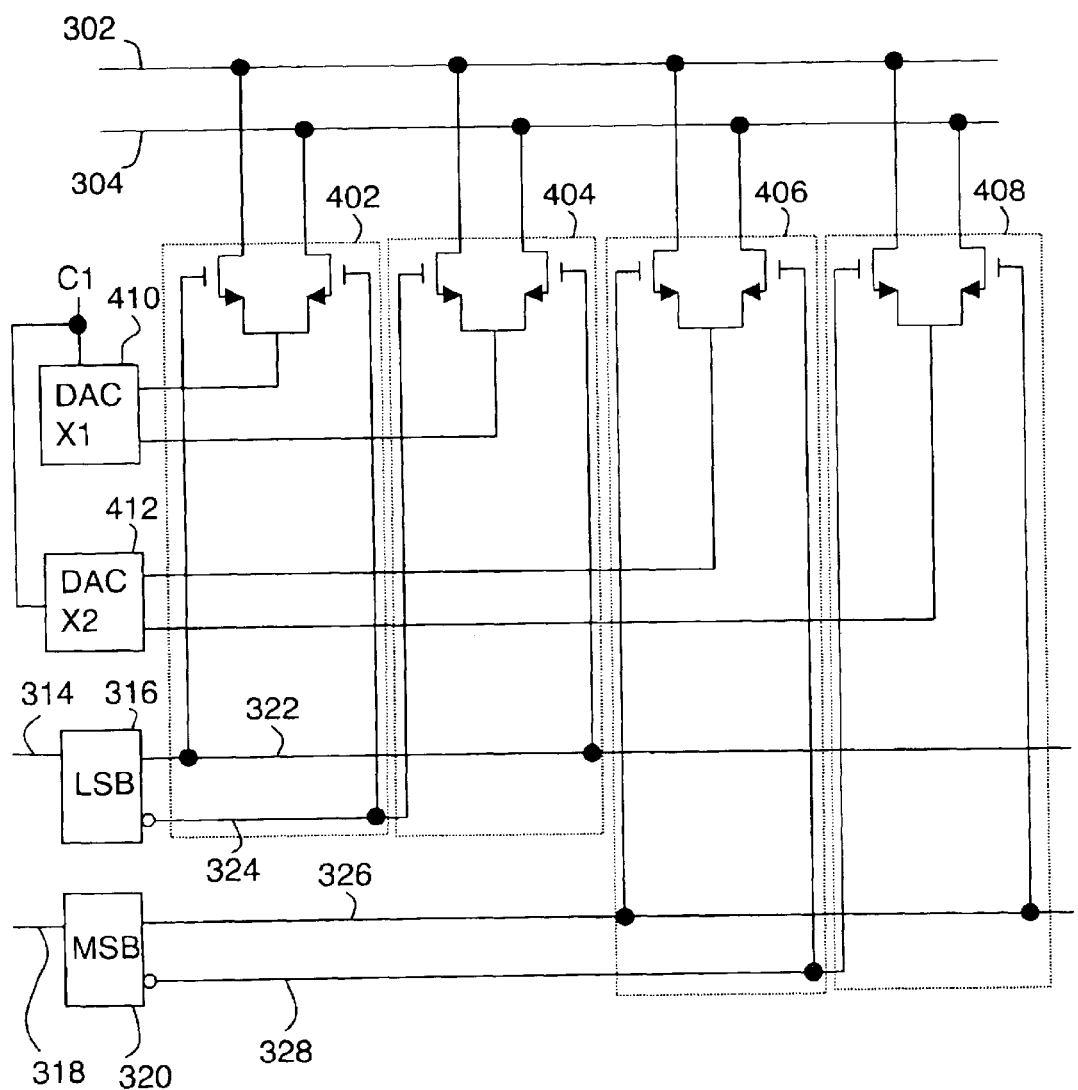
FIG. 4 is a circuit schematic diagram of a current-mode transversal filter tap according to another embodiment of the invention.

FIG. 4 is a circuit schematic diagram of a current-mode transversal filter tap according to another embodiment of the invention. In the example of FIG. 4, the coefficient C1 is supplied as a digital input (instead of the analog input of FIG. 3). More specifically, coefficient C1 is input to two digital to analog converters (DACs), 410 and 412. DACs 410 and 412 each provide a differential current output, and the output of DAC 412 is twice the output of DAC 410. Gilbert cell multipliers 402 and 404 have DAC 410 and the data LSB as inputs. Gilbert cell multipliers 406 and 408 have DAC 412 and the data MSB as inputs. Multipliers 402, 404, 406, and 408 each provide a differential current output to nodes 302 and 304. The opposite polarity of multipliers 402 and 404 is provided by opposite polarity connections to register 316. Similarly, the opposite polarity of multipliers 406 and 408 is provided by opposite polarity connections to register 320. DACs 410 and 412 need not be high-speed DACs, since the coefficient C1 is typically either fixed or only slowly time varying. Multipliers 402, 404, 406, and 408, combined with DACs 410 and 412, all function as binary current sources, as discussed above.

Figure 5:
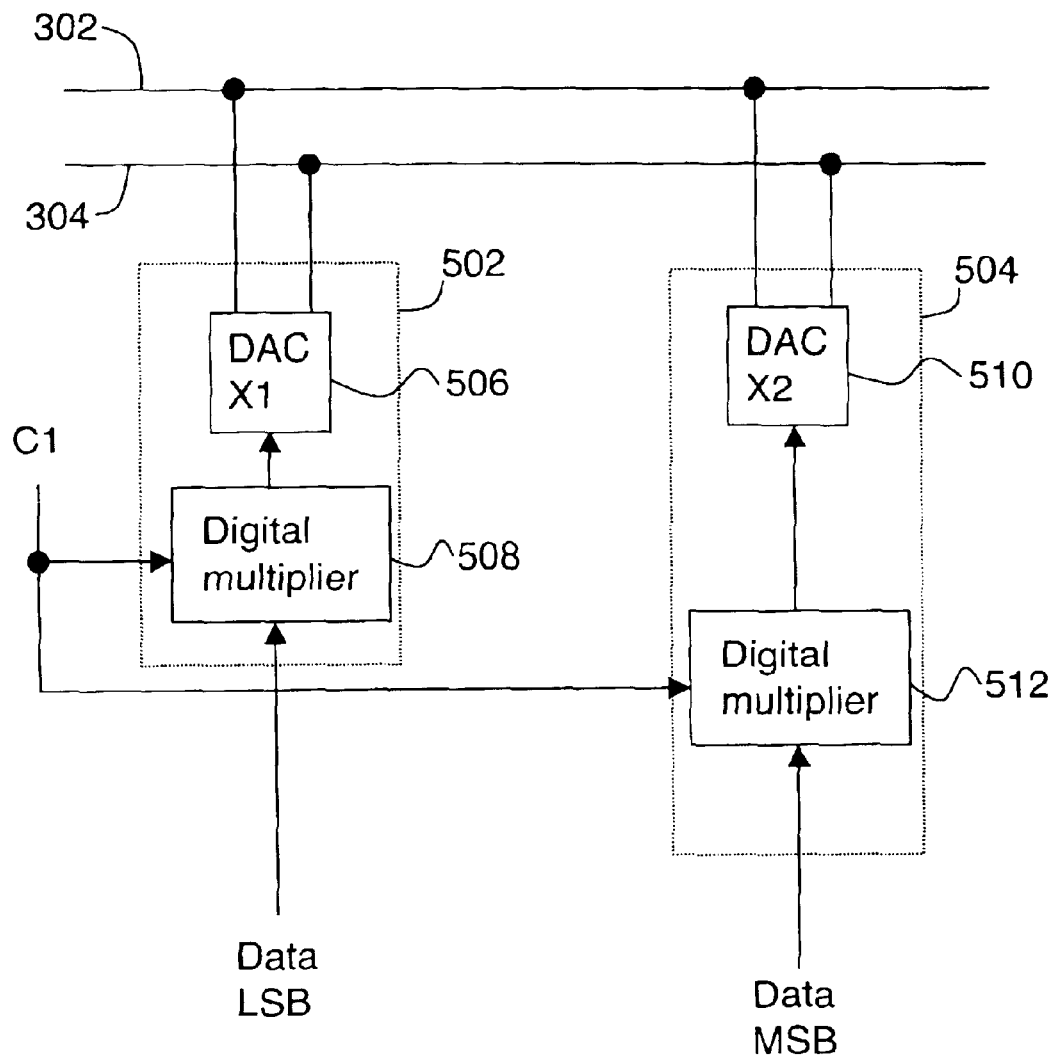
FIG. 5 is a circuit schematic diagram of a current-mode transversal filter tap according to yet another embodiment of the invention.

FIG. 5 is a circuit schematic diagram of a current-mode transversal filter tap according to yet another embodiment of the invention. In the example of FIG. 5, the coefficient C1 is supplied as a digital input, and multiplication of the data bits and coefficient C1 is performed in the digital domain with digital multipliers 508 and 512. The output of digital multiplier 508 is received by a DAC 506 which provides a differential current output to nodes 302 and 304. The output of digital multiplier 512 is received by a DAC 510 which also provides a differential current output to nodes 302 and 304. DAC 510 provides twice the output current as DAC 506 for equal digital inputs. The combination of multiplier 508 and DAC 506 acts as a binary current source 502. Similarly, the combination of multiplier 512 and DAC 510 also acts as a binary current source 504. DACs 506 and 510 on FIG. 5 must operate at the data baud rate, while DACs 410 and 412 can operate much more slowly (i.e., DACs 410 and 412 merely need to be fast enough to keep up with adaptively changing filter coefficients). Accordingly, the embodiments of FIGS. 3 and 4 are preferable to the embodiment of FIG. 5 for high data rates.

Figure 6:
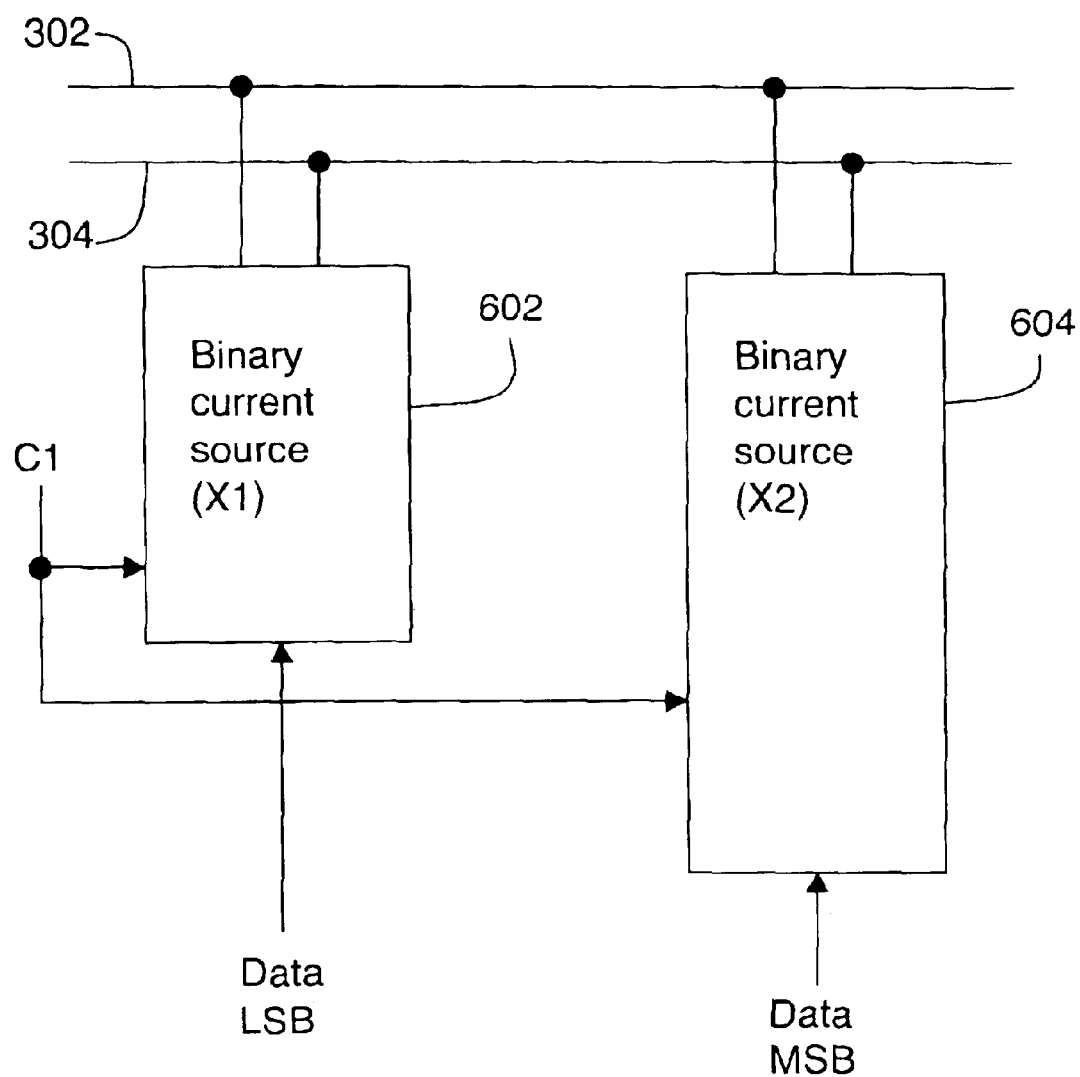
FIG. 6 is a block diagram of a transversal filter tap according to an embodiment of the invention.

FIG. 6 is a block diagram of a current-mode transversal filter tap according to an embodiment of the invention. In the example of FIG. 6, a binary current source 602 receives a coefficient C1 and a data LSB, and provides a differential current to nodes 302 and 304. Similarly, a binary current source 604 receives coefficient C1 and a data MSB, and provides a differential current to nodes 302 and 304. Binary current source 604 provides twice the output of binary current source 602 for the same inputs. The more detailed implementations shown in FIGS. 3–5 are all consistent with the simplified block diagram of FIG. 6.

Figure 7:
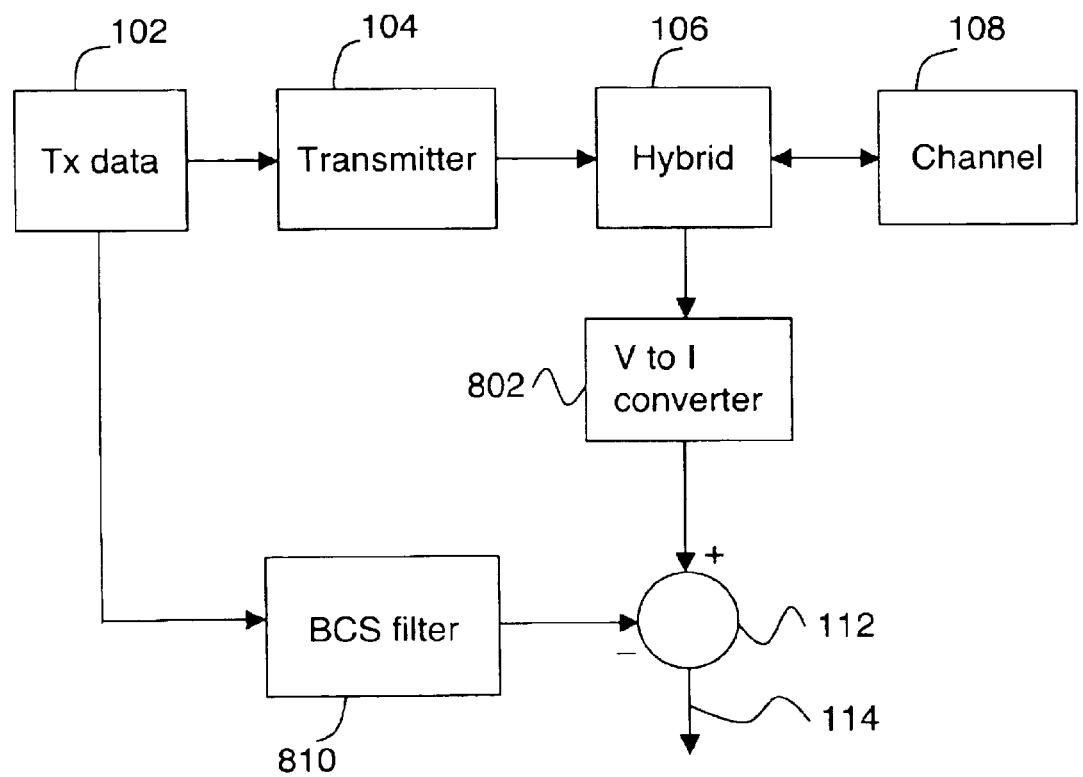
FIG. 7 is a block diagram of a communication system including an echo canceller according to an embodiment of the invention.

FIG. 7 is a block diagram of a communication system including an echo canceller according to an embodiment of the invention. The embodiment of FIG. 7 differs from the example of FIG. 1 by insertion of a voltage to current converter 802 between hybrid 106 and summing junction 112, and by substitution of a BCS filter 810 including taps having binary current sources for generic filter 110. Voltage to current converters, such as 802, are known in the art. The invention can be practiced with or without hybrid 106. However, in most cases, it is preferable to include hybrid 106, because it reduces echo and thereby eases the requirements placed on BCS filter 810. Each tap in BCS filter 810 can have an individually adjusted dynamic range. For example, early taps can have a larger dynamic range than later taps, which is desirable since the interference signal to be cancelled generally decreases as delay increases. Tap dynamic range can easily be scaled (e.g., by scaling the number and/or output of tap current sources). Such ease of tap scaling is an advantage of the invention.

The invention is also applicable to various cases not explicitly discussed in the above embodiments. For example, echo cancellation relies on knowledge of the transmitted signal to approximately remove its associated interference from the received signal. Interference from any other known signal can also be approximately removed from the received signal in much the same way. To outline some possibilities, it is helpful to consider a communication system having channels A and B connecting a near end transceiver to a far end transceiver.

Interference in near end reception from channel A due to near end transmission to channel A is an example of echo, as discussed above. Interference in near end reception from channel A due to near end transmission to channel B is an example of near end cross talk (NEXT). Interference in near end reception from channel A due to far end transmission to channel B is an example of far end cross talk (FEXT). Thus NEXT and FEXT are two more examples, in addition to echo, of the types of interference that can be reduced according to the invention. For FEXT, the received signal in channel B can be regarded as equivalent to the far end interfering signal, thus making the interference signal known at the near end.

Although the above examples all show binary current sources having output currents which differ by a factor of two, such a relation between source outputs is not required.

Generally, binary current sources outputs can be selected to match the data bits to the modulation scheme being used in practicing the invention. The invention is broadly applicable to various multi-level modulation schemes, such as PAM and trellis coding.

What is claimed is:

1. A receiver for receiving an input signal including a data signal and an interference signal derived from an interference data stream, the receiver comprising:
    a voltage to current converter for converting said input signal to an input current signal;
    a data to current converter comprising a plurality of binary current sources, wherein each of said sources receives a binary data bit input from said interference data stream, wherein each of said sources provides a corresponding output source current having either of two values responsive to said binary data bit input, and wherein said output source currents are summed to provide a correction current signal;
    a current summing node receiving said input current signal and said correction current signal and providing a processed current signal;
    whereby interference from said interference signal is reduced in said processed current signal.

2. The receiver of claim 1, wherein said output source currents of said binary current sources have values which follow a geometric progression having a common ratio.

3. The receiver of claim 2, wherein said common ratio is two.

4. The receiver of claim 1, wherein said data signal is a pulse amplitude modulated signal.

5. The receiver of claim 1, wherein said output source current values are time invariant.

6. The receiver of claim 1, wherein said output source current values are time-varying.

7. The receiver of claim 1, wherein said output source currents are determined by an adaptive control loop.

8. The receiver of claim 1, wherein said input signal is received from a channel, further comprising:
    a transmitter providing a transmitted signal to said channel, and
    an echo-canceling hybrid connected to said transmitter and to said channel.

9. The receiver of claim 1, wherein at least one of said binary current sources comprises a Gilbert cell multiplier.

10. The receiver of claim 1, wherein at least one of said binary current sources comprises a digital to analog converter having a current output.

11. The receiver of claim 1, wherein said input signal is received from a channel, further comprising a transmitter providing a transmitted signal to said channel, wherein said interference data stream corresponds to said transmitted signal.

12. The receiver of claim 1, wherein said input signal is received from a first channel, further comprising a transmitter providing a transmitted signal to a second channel, wherein said interference data stream corresponds to said transmitted signal to said second channel.

13. The receiver of claim 1, wherein said input signal is received from a first channel and an additional input signal is received from a second channel, and wherein said interference data stream corresponds to said additional input signal.

14. The receiver of claim 1, further comprising a delay line comprising one or more tap data to current converters, each comprising a plurality of binary current sources, wherein each of said sources receives a delayed binary data bit input from said interference data stream, wherein each of said sources provides a corresponding output source current having either of two values responsive to said delayed binary data bit input, wherein said output source currents are summed to provide a tap correction current signal, and wherein each of said tap correction current signals is provided to said current summing node.

15. A method for receiving an input signal including a data signal and an interference signal derived from an interference data stream, the method comprising:
    a) converting said input signal to an input current signal;
    b) providing a data to current converter comprising a plurality of binary current sources, wherein each of said sources receives a binary data bit input from said interference data stream, wherein each of said sources provides a corresponding output source current having either of two values responsive to said binary data bit input;
    c) summing said output source currents to provide a correction current signal; and
    d) summing said input current signal and said correction current signal to provide a processed current signal;
    whereby interference from said interference signal is reduced in said processed current signal.

* * * * *

UNITED STATES PATENT AND TRADEMARK OFFICE
CERTIFICATE OF CORRECTION

PATENT NO. : 6,934,265 B2 Page 1 of 1
APPLICATION NO. : 10/910155
DATED : August 23, 2005
INVENTOR(S) : Susumu Hara and Mark Callicotte It is certified that error appears in the above-identified patent and that said Letters Patent is hereby corrected as shown below:

Title Page, (75) Inventors: Reads: "Susuma Hara" Should Read: "Susumu Hara"

Signed and Sealed this

Twenty-eighth Day of July, 2009

JOHN DOLL
*Acting Director of the United States Patent and Trademark Office*